(12) United States Patent
Coen et al.

(10) Patent No.: US 10,947,000 B2
(45) Date of Patent: Mar. 16, 2021

(54) LABELLER AND METHOD FOR AGRICULTURAL BALE PRESS

(71) Applicant: OCTINION BVBA, Heverlee (BE)

(72) Inventors: Tom Coen, Zemst (BE); Dries Gielis, Everberg (BE); Jan Anthonis, Oud-Heverlee (BE)

(73) Assignee: OCTINION BVBA, Heverlee (BE)

( * ) Notice: Subject to any disclaimer, the term of this patent is extended or adjusted under 35 U.S.C. 154(b) by 231 days.

(21) Appl. No.: 16/062,709

(22) PCT Filed: Dec. 19, 2016

(86) PCT No.: PCT/EP2016/081790
§ 371 (c)(1),
(2) Date: Jun. 15, 2018

(87) PCT Pub. No.: WO2017/103277
PCT Pub. Date: Jun. 22, 2017

(65) Prior Publication Data
US 2019/0002151 A1    Jan. 3, 2019

(30) Foreign Application Priority Data

Dec. 17, 2015  (BE) .................................. 2015/5826

(51) Int. Cl.
*B65C 7/00* (2006.01)
*G09F 3/14* (2006.01)
*A01F 15/14* (2006.01)

(52) U.S. Cl.
CPC .............. *B65C 7/00* (2013.01); *A01F 15/14* (2013.01); *A01F 15/145* (2013.01); *G09F 3/14* (2013.01)

(58) Field of Classification Search
CPC .... B65C 3/00; B65C 7/00; B65C 9/10; B65C 9/12; A01F 15/00; A01F 15/07;
(Continued)

(56) References Cited

U.S. PATENT DOCUMENTS

| 1,328,019 A | 1/1920 | Stewart |
| 3,783,575 A | 1/1974 | Angenendt |
(Continued)

FOREIGN PATENT DOCUMENTS

| BE | 1018204 A3 | 7/2010 |
| BE | 1019971 A3 | 3/2013 |
(Continued)

OTHER PUBLICATIONS

Belgian Search Report from BE Application No. BE 201505826, dated Aug. 3, 2016.
(Continued)

*Primary Examiner* — Gregory D Swiatocha
*Assistant Examiner* — Fred C Hammers
(74) *Attorney, Agent, or Firm* — Workman Nydegger

(57) ABSTRACT

A device and a method for attaching a label for identifying a bale to an elongate flexible object, wherein the device comprises storage means for the label and attachment means for attaching the label to the elongate flexible object, and wherein the label, on its edge, has an opening which is adapted to attach the label to the elongate flexible object.

14 Claims, 20 Drawing Sheets

(58) Field of Classification Search
CPC ........ A01F 15/08; A01F 15/14; A01F 15/145; G09F 3/14; B30B 9/3003; B65F 1/1405; B65B 13/182
USPC .......... 100/2, 3, 15, 87, 88, 89, 102; 53/410, 53/415, 135.1
See application file for complete search history.

(56) References Cited

U.S. PATENT DOCUMENTS

| | | | |
|---|---|---|---|
| 7,415,924 B2 * | 8/2008 | Roberts | A01F 15/08 100/102 |
| 7,854,195 B2 | 12/2010 | Van Groenigen | |
| 9,943,036 B2 * | 4/2018 | Verhaeghe | A01F 15/08 |
| 2009/0007805 A1 | 1/2009 | Van Groenigen | |
| 2009/0056880 A1 | 3/2009 | Johnson | |
| 2014/0157999 A1 | 6/2014 | Verhaeghe et al. | |

FOREIGN PATENT DOCUMENTS

| | | | |
|---|---|---|---|
| DE | 2119385 A1 | 10/1972 | |
| NL | 1004347 * | 10/1996 | ............... B65C 3/02 |
| NL | 1004347 C2 | 4/1998 | |
| WO | 2009080059 A1 | 7/2009 | |
| WO | 2012152677 A1 | 11/2012 | |

OTHER PUBLICATIONS

International Search Report from PCT Application No. PCT/EP2016/081790, dated Mar. 23, 2017.

* cited by examiner

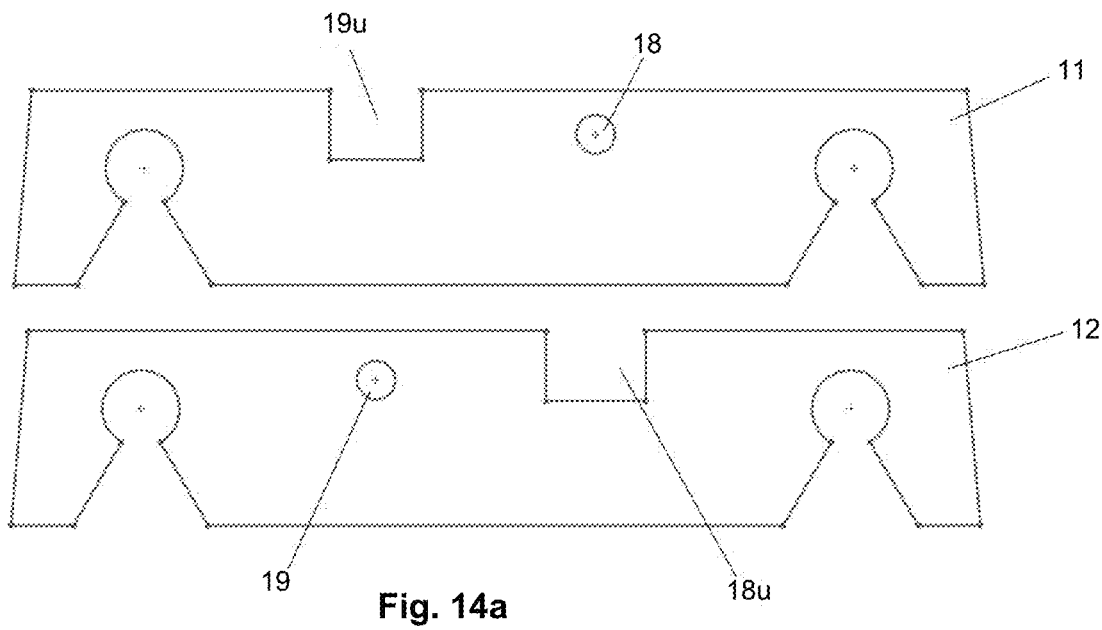
Fig. 14a
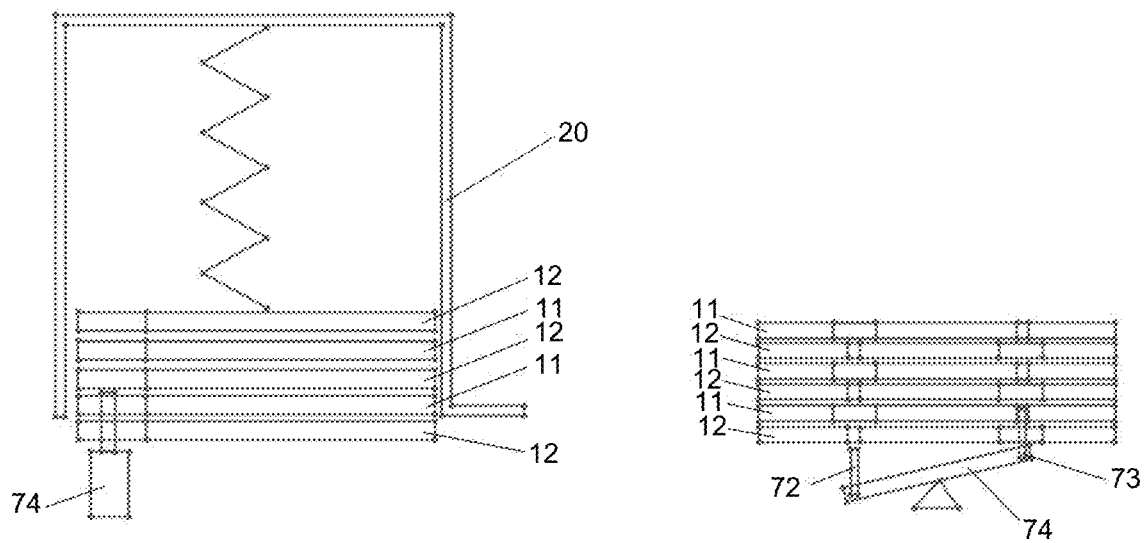
Fig. 14b
Fig. 14c

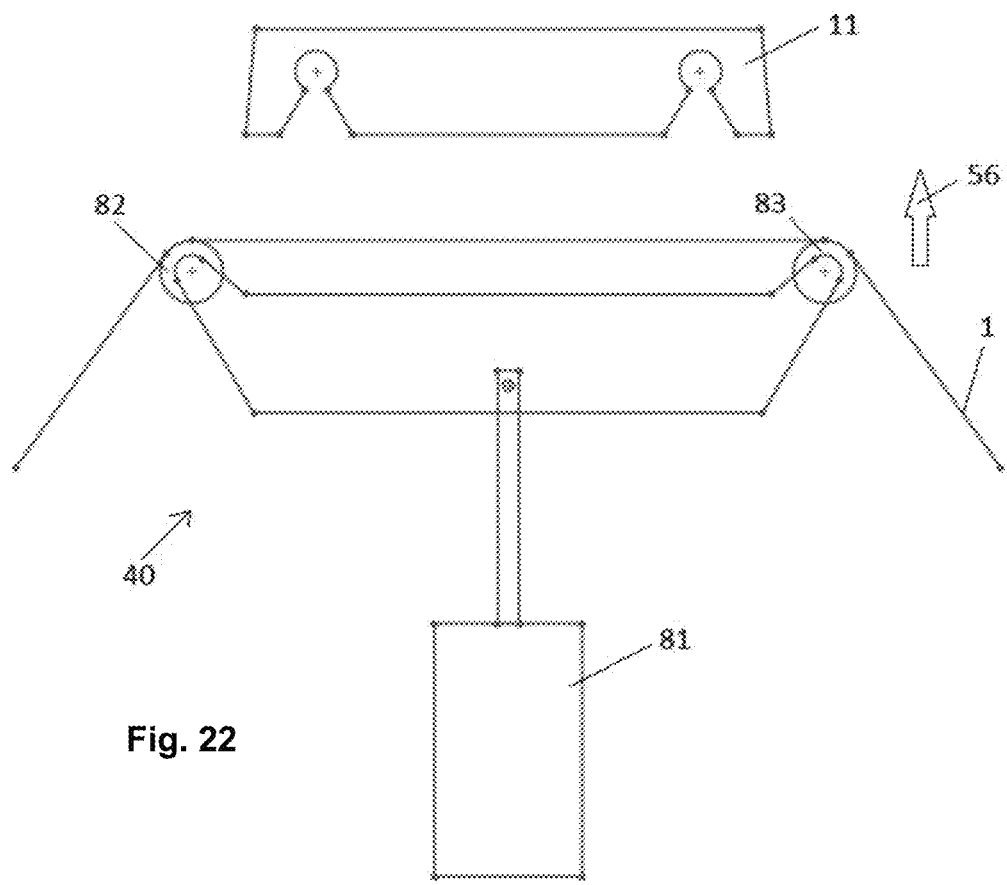
Fig. 22
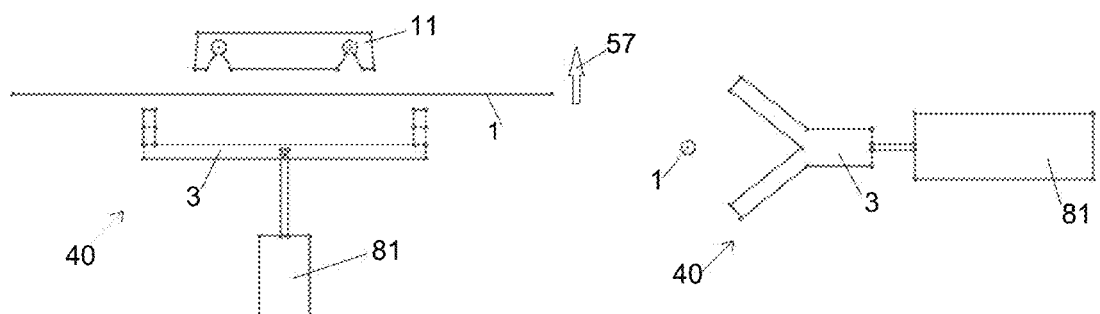
Fig. 23a
Fig. 23b

LABELLER AND METHOD FOR AGRICULTURAL BALE PRESS

TECHNICAL FIELD OF THE INVENTION

The present invention relates to a device and a method for processing and distributing agricultural crops. More particularly, the invention relates to a device and a method for applying a label to bales of agricultural crops for identification.

BACKGROUND OF THE INVENTION

An agricultural bale press is a machine, typically towed behind agricultural vehicles, such as tractors, and used to form bales of agricultural crops, such as straw, hay, silage or other biomass. In the baling chamber, the biomass is generally compressed. The finished bales are tied up using twine or another elongate flexible object or packaged in another way. Following this, the bales are ejected from the bale press.

Agricultural bales are typically used in animal feed, as bedding or for other purposes. As agricultural crops enter the food chain via animals, they may affect food safety. Consumers, food manufacturers and government agencies are concerned about food safety, and can demand traceability of everything that is used in producing food, including agricultural bales. Traceability may also be advantageous for managing the distribution and the supply chain in connection with agricultural bales. Another application is the use as biomass for incineration in bioenergy power plants. If a case of air pollution occurs, it has to be possible to trace where the fuel originated from.

US2009056880A1 describes an apparatus for fitting a label provided with a bonding agent around an elongate flexible object, such as a twine for tying up agricultural bales.

BE1019971A3 describes a label arrangement which comprises a labeler for applying labels to a ribbon-like object for tying up a bale of an agricultural crop.

BE1018204A3 describes improvements in square bale presses and more specifically with regard to the mechanisms which are used to tie up the bales using pieces of twine and to make knots in the twine.

SUMMARY OF THE INVENTION

Embodiments according to the invention solve one or more problems of existing devices and methods for identifying bales.

According to a first aspect of the invention, the invention comprises a device, also referred to as "labeler" in this document, for attaching a label for identifying a bale to an elongate flexible object, wherein the label has an edge and is provided with a first opening and a second opening on the edge of the label, such that an edge of the first opening and the second opening coincides with a part of the edge of the label, and wherein the first opening and the second opening are adapted to attach the label to the elongate flexible object, the device comprising: storage means for storing labels; attachment means for attaching the label to the elongate flexible object in such a way that the first opening and the second opening come into contact with the elongate flexible object, by bending the label and by pushing the label over the elongate flexible object or pushing the elongate flexible object into the label; wherein the label is bendable and adapted to clamp the elongate flexible object in the first opening and the second opening under bending stress of the label, and wherein the attachment means comprise bending means for bending the label.

As the label serves to identify the bale, it has to be ensured that the label remains securely attached to the bale during further manipulation of the latter.

In this document, an "opening on the edge of a label" means that the opening has an edge, that the label has an edge and that the edge of the opening coincides with a part of the edge of the label.

The elongate flexible object may be a twine.

The label may comprise means for automatic identification, as known from the prior art. These means for automatic identification may comprise an RFID.

The device may furthermore comprise transport means for transporting the label from the storage means to the attachment means.

The transport means may comprise entrainment means for carrying the label along. The label may comprise entrainment means, such as for example projections.

The transport means may comprise a conveyor belt from the store to the attachment means.

The transport means may comprise transport rollers for transporting a label from the store to the attachment means.

The device may comprise separating means for presenting exactly one label to the attachment means. Thus, it is possible to prevent two labels from being taken out of the store together, for example due to them sticking together, and both even being attached together.

The separating may be carried out by means of a translation.

The separating may be carried out by means of a rotation.

The label may form part of a bundle of labels, stored in the store, wherein the device then comprises release means for releasing the label from the bundle. In order to fill the store, it is then possible to introduce one or a few label bundles into the store at once.

The invention also comprises a bale press which comprises a device according to the invention.

According to a second aspect of the invention, the invention comprises a method for automatically attaching, in a device, a label for identifying a bale to an elongate flexible object, wherein the label has an edge and is provided with a first opening and a second opening on the edge of the label, such that an edge of the first opening and the second opening coincides with a part of the edge of the label, the method comprising: storing the label; attaching the label to the elongate flexible object in such a way that the first opening and the second opening on the edge of the label come into contact with the elongate flexible object, by bending the label and by pushing the label over the elongate flexible object or pushing the elongate flexible object into the label.

The method may furthermore comprise transporting a stored label.

The method may furthermore comprise presenting exactly one label for attachment.

In this case, a label may be rotated. In this case, a label may be displaced (by means of a translational movement).

The method may furthermore comprise releasing the label from a bundle of labels.

The elongate flexible object may be a twine.

The method may furthermore comprise attaching the twine around the bale.

According to yet another aspect of the invention, the invention comprises a label, and a bundle of labels, according to embodiments described in this document.

An advantage of some embodiments of a device according to the invention is the great reliability of the attachment due to the fact that no adhesive is required; in the case of a glued or bonded connection, the presence of dust, remains of agricultural crops and the like has a detrimental effect on the quality of the attachment.

Another advantage of certain embodiments of a device according to the invention is the ease with which the label can be read due to the fact that it is always in the same position.

Embodiments of the invention may also have the following advantages. The labeler can be very compact and is consequently easy to incorporate in an existing bale press or in a new bale press still to be designed. After all, due to the fact that the labeler is so compact, it can also be built into the bale press. The labeler may, for example, be built in at locations where the string does not yet lie on the bale and moves through the air (in the knotter, where the twine is knotted around the bale, or upstream of the knotter). This simplifies the application of the label and increases the reliability of the application. The concept is very simple, as a result of which the labeler is very reliable, as is the label itself and the application of the label. This is important in the demanding agricultural environment. Due to the simplicity and compactness of the labeler, the cost price can also be kept low, which is very important in order to sell large numbers thereof. The label itself is also very simple and thus cost-efficient. A large receptacle tray containing labels can readily be coupled to the labeler, as a result of which the system can be used quickly.

BRIEF DESCRIPTION OF THE DRAWINGS

The invention will now be described further, solely by way of example, by means of the attached drawings, in which:

FIGS. 14a-14c show an embodiment with two different forms of labels;

FIGS. 21a-23b show embodiments of attachment means and bending means;

EMBODIMENTS

Figure 1A:
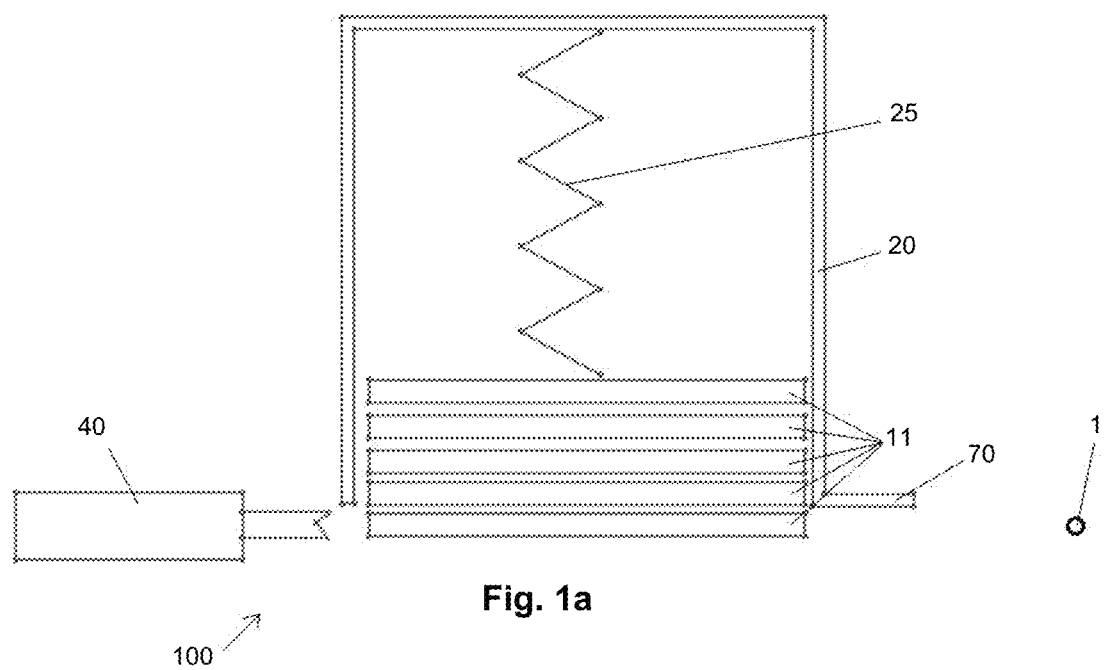
FIGS. 1a and 1b show a diagrammatic representation of an embodiment of a device according to the invention for attaching a label for identifying a bale to an elongate flexible object.

The present invention will be described by means of specific embodiments and with reference to specific figures. However, the invention is not limited thereto, but is only limited by the scope of protection of the claims. The figures are only diagrammatic and are non-limiting. For illustrative purposes, the dimensions of some elements in the figures may have been exaggerated and may not be to scale. The dimensions and relative dimensions do not necessarily correspond to the actual dimensions of physical embodiments.

Furthermore, the terms first, second, third and similar terms are only used to differentiate between different similar elements and these terms do not necessarily describe a specific sequence, either in time, or in space, order, sequence, or in any other way. It will be clear that the terms are interchangeable under appropriate circumstances and that the embodiments of the invention described herein can function in another sequence than that described or illustrated here.

It should be noted that the terms "contain" and "comprise" should not be interpreted as being limited to the steps, elements, pieces, components or the like which are listed thereafter. This term does not exclude further steps, elements, pieces, components or the like. It indicates the presence of steps, elements, pieces, components or the like, but does not exclude the presence of one or more steps, elements, pieces, components or the like, or of groups of steps, elements, pieces, components or the like. Thus, the scope of the expression "a device containing A and B" is not limited to a device which only consists of A and B. It means that, in the light of the present invention, the components or elements of the device which are relevant for the invention are A and B.

A reference to "one" or "an" embodiment means that specific features, properties or structures described in relation to that embodiment are at least incorporated in at least one embodiment according to the invention. Therefore, references to "in an embodiment" or "in one embodiment" in various parts of the description do not necessarily refer to the same embodiment, although they may refer to the same embodiment. Furthermore, the specific features, properties or structures may be combined in one or more embodiments, as will be clear to someone skilled in the art.

Similarly, it should be understood that, in the description of the exemplary embodiments, different features of the invention are sometimes grouped in one embodiment, figure or part of the description with the aim of providing a clear description in order to explain the different features of the invention. However, this way of representation does not mean that the invention could not contain more features than those which have been formulated in the claims. Rather, as will be clear from the attached claims, the ingenuity of the invention is in less than all features of one single prior embodiment as described. Thus, the claims following the description are herewith explicitly incorporated in the detailed description of the invention, with each of the claims per se forming a separate embodiment of the invention.

Furthermore, although some of the embodiments contain specific features described herein and not others, combinations of features of the different embodiments are intended to fall within the scope of the invention, as it may be understood by someone skilled in the art.

The accompanying description describes and illustrates numerous details. However, it will be clear that the invention can be executed without these specific details. In other cases, methods, structures, elements and the like which are already known are not shown in order not to make the description unnecessarily unclear in the light of the invention.

The invention will now be described by means of a detailed description of different embodiments of the invention. It will be clear that other embodiments may be configured according to the knowledge of the person skilled in the art without deviating from the technical contribution of the invention. The invention is only limited by the phrasing of the attached claims.

Figure 1B:
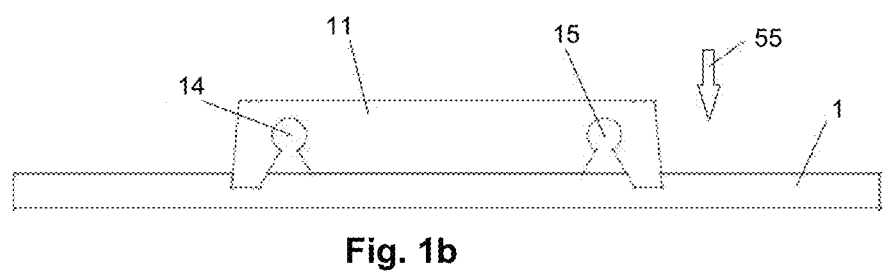

FIGS. 1a and 1b diagrammatically illustrate an embodiment of a device 100 for attaching a label 11 for identifying a bale to an elongate flexible object 1, such as a twine. The device 100 comprises a store 20 filled with labels 11 and comprises attachment means 40 for attaching a label to the elongate flexible object. The labels in the store may be pressed down by a press-on mechanism 25. In the embodiment from FIG. 1a, a label 11 is pushed out of the store 20 and attached to twine 1 by attachment means 40, e.g. an actuator. FIG. 1b shows an embodiment of a label 11 in more detail; here, the attachment means 40 move the label 11 in the direction of arrow 55 towards twine 1 in order to be attached to the latter.

In the illustrated embodiment, the label 11 has two openings 14, 15 on the edge of the label. These openings 14, 15 are adapted to attach the label 11 to the elongate flexible object 1; in the illustrated embodiment, the width of the openings 14, 15 initially decreases towards the inner side of the label up to a constriction and subsequently widens again, so that the elongate flexible object fits well into the openings 14,15 of the label 11 after attachment.

A label may have, for example, the following dimensions (only by way of example): 8 cm×2 cm×1.2 mm (thickness).

Figure 2:
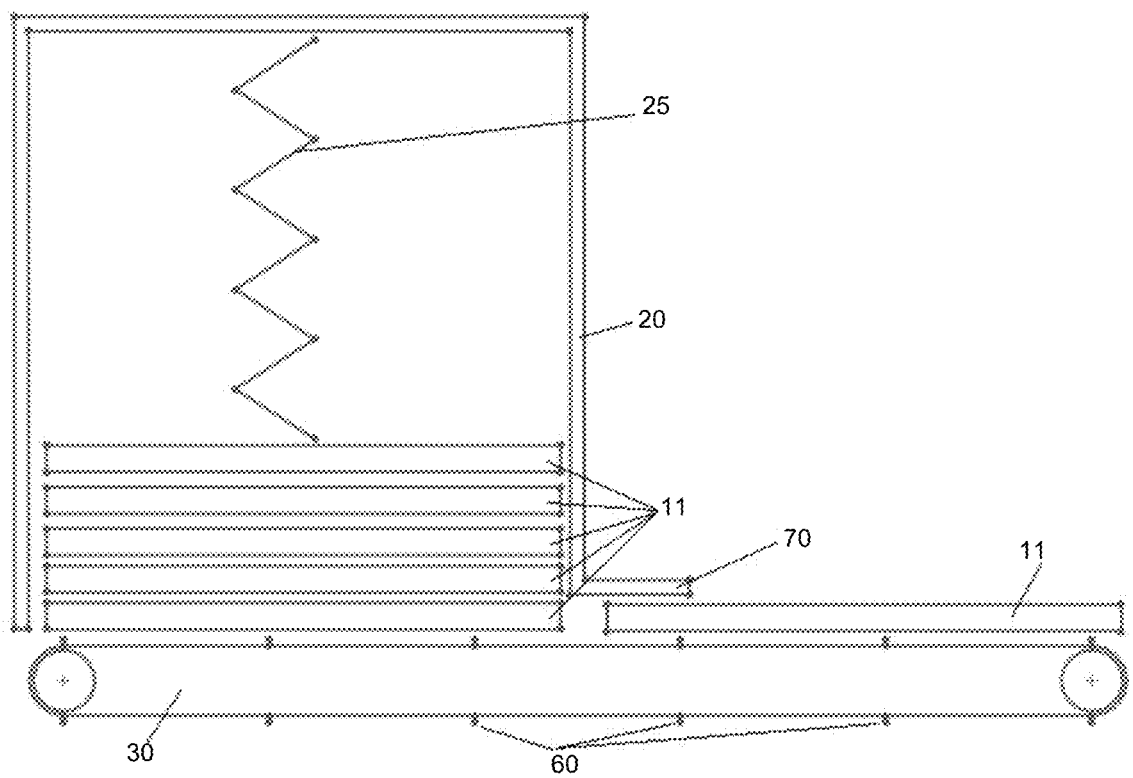
FIGS. 2-7b show embodiments of storage means and transport means for labels.

FIG. 2 is a diagrammatic section of a store 20 filled with labels 11. These labels may be pressed on by means of a press-on mechanism 25. This may contain a spring, optionally combined with an actuator so as to always keep the spring in the optimum operating area on plane of compression. Below the store, a conveyor belt 30 is installed which may be provided with a structure or pattern 60 in order to make it easier to entrain the label. The bottom label may thus be prepared and placed next to the store in order to then be attached to the elongate flexible object. The stop edge 70 ensures that the label is passed to the correct position and keeps the label clamped, once it has been pushed out of the store. This stop edge is an embodiment of separating means of the device which serve to present exactly one label to the attachment means.

Figure 3:
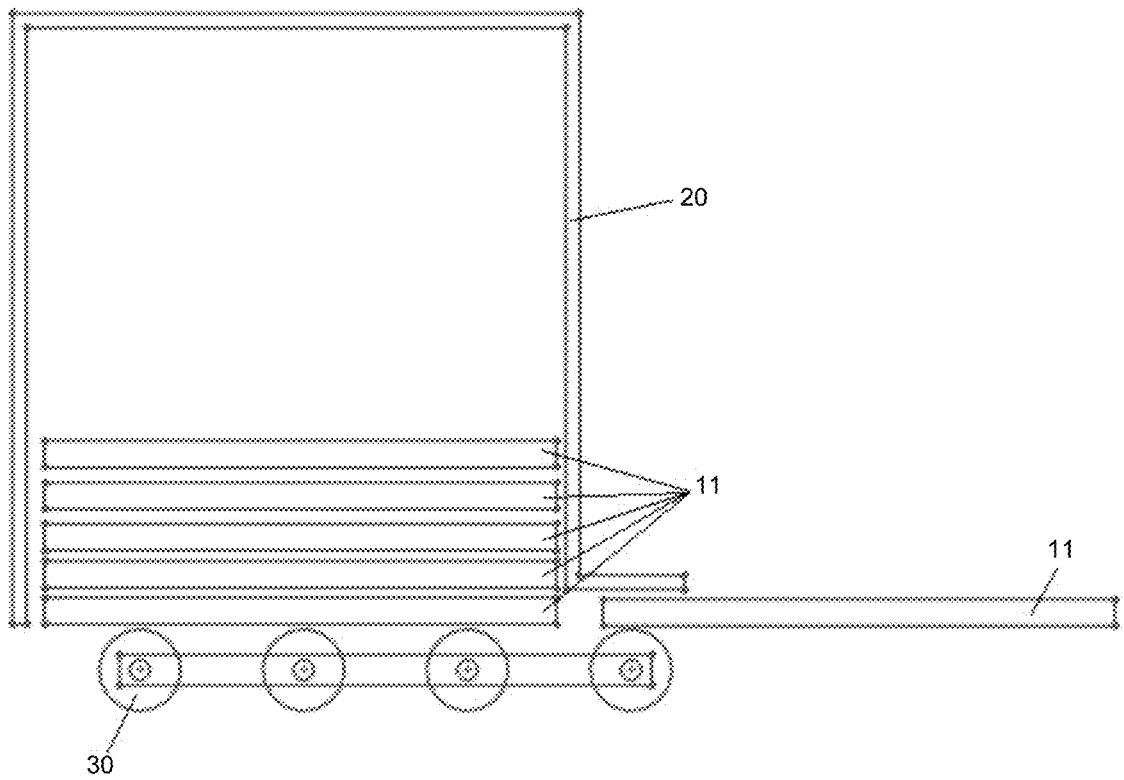

FIG. 3 is a diagrammatic section of a store 20 filled with labels 11. Below the store, wheels 30 are fitted which push the label forwards. These wheels and/or the labels may be provided with a profile for better traction of the wheels on the label. In this way, the bottom label may be prepared and placed next to the store. The stop edge 70 ensures that the label is passed to the correct position and keeps the label clamped, once it has been pushed out of the store.

Figure 4:
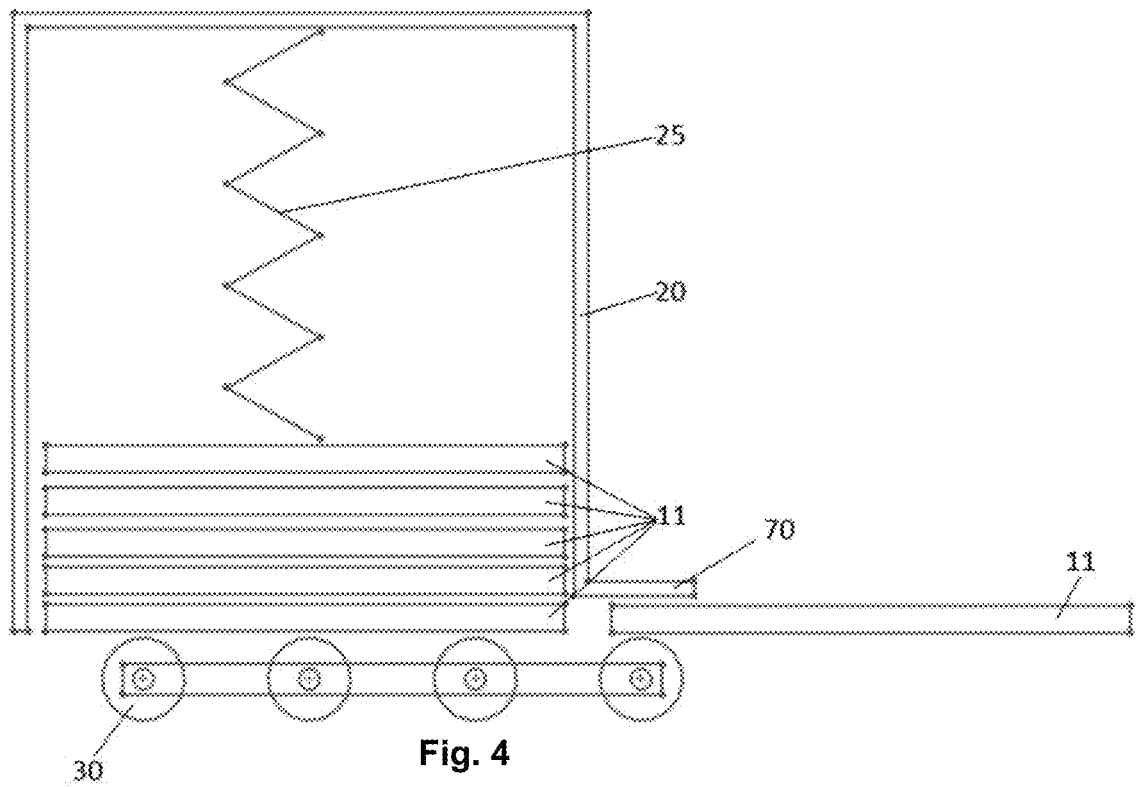

In the embodiment of FIG. 4, a press-on mechanism 25 is additionally provided.

Figure 5:
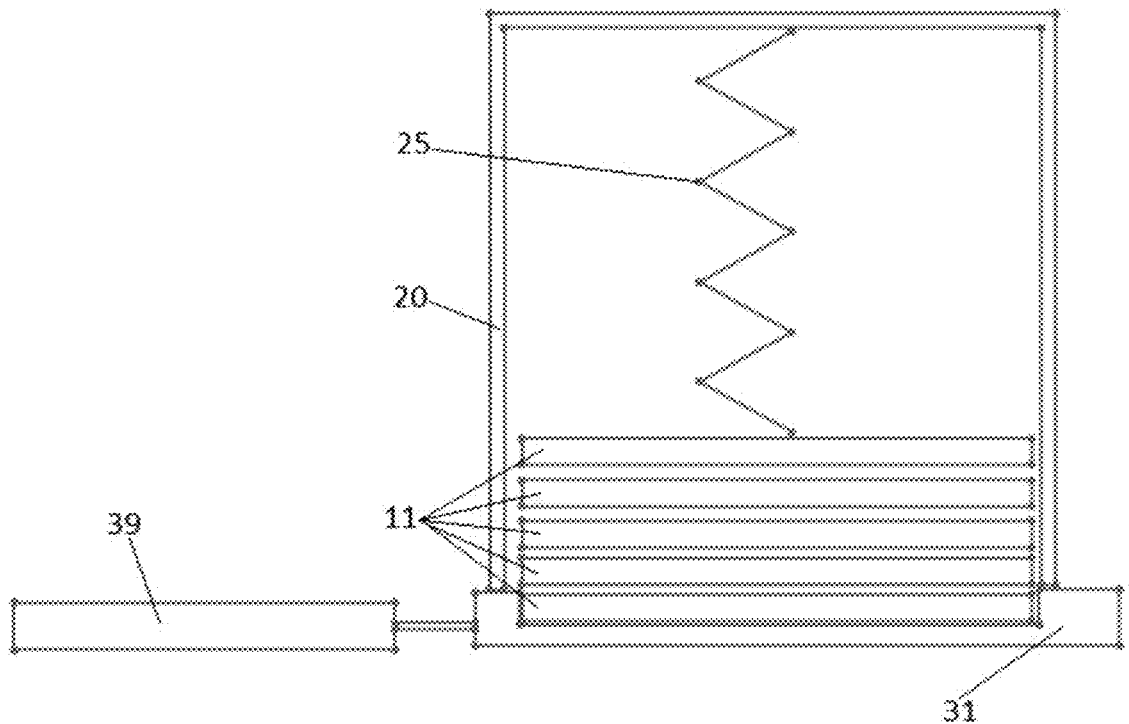
Figure 6:
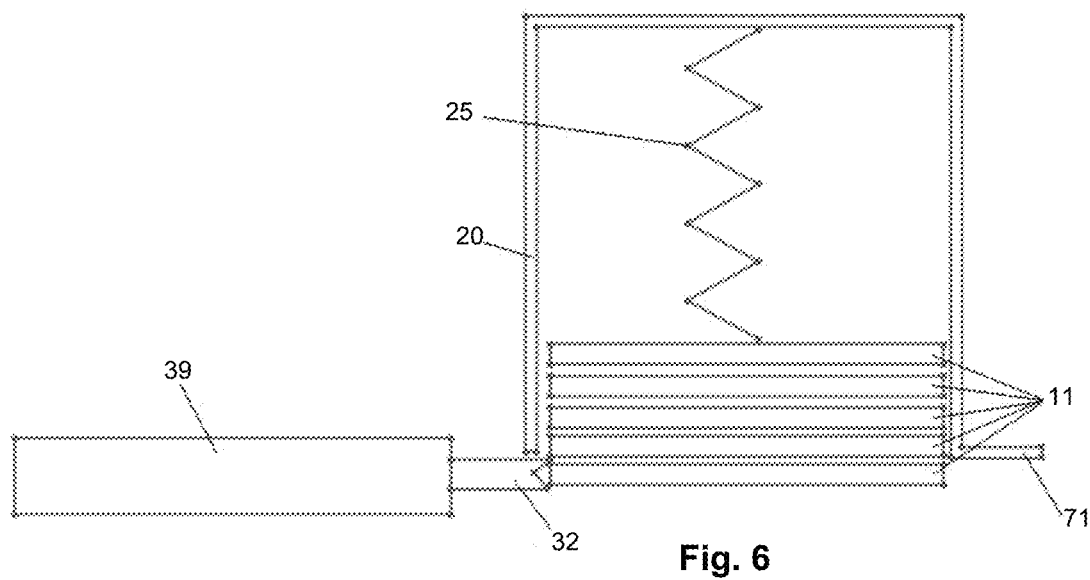

As is illustrated in FIGS. 2-4, transport means may be provided, such as a conveyor belt or wheels, in order to transport a label from the store to means for attaching the label to the elongate flexible object. Other embodiments of transport means are illustrated in FIGS. 5 and 6. In still other embodiments of the device for attaching the label, no transport means are present, but the label arrives directly from the store, e.g. through the force of gravity, at the attachment means.

FIG. 5 is a diagrammatic section of a store 20 filled with labels 11. These labels may be pressed on by a press-on mechanism 25. The label is pushed into a holder 31. This holder may be pushed out to the right by an actuator 39, towards the attachment means of the label.

FIG. 6 is a diagrammatic section of a store 20 filled with labels 11. These labels may be pressed on by a press-on mechanism 25. The bottom label may be pushed to the right by a gripper 32, driven by an actuator 39. The stop edge 71 keeps the label in place.

Figure 7A:
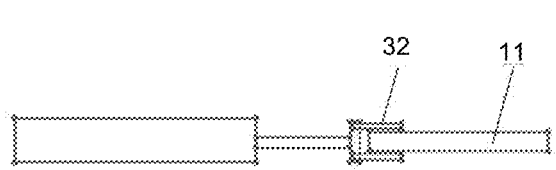
Figure 7B:
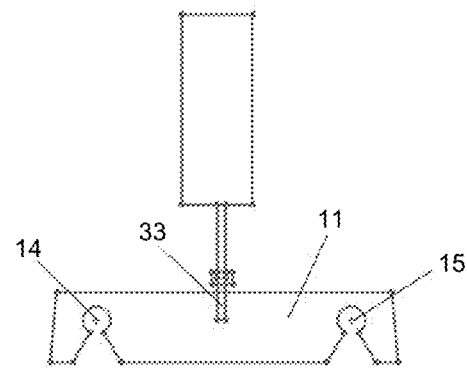
Figure 8A:
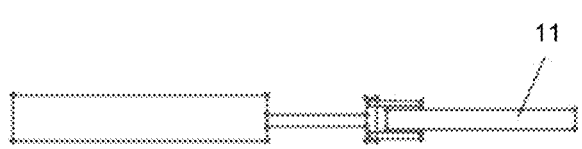
FIGS. 8a-9 show embodiments of bending means.
Figure 8B:
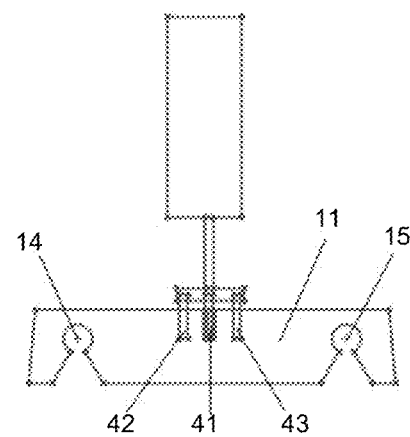

FIGS. 7a, 7b, and 8 illustrate in detail what the gripper 32 could look like. FIGS. 7a and 7b, represents a design for a gripper with two fingers. FIG. 7a shows a side view of gripper 32 and label 11, FIG. 7b shows the top view. The fingers 33 of the gripper may, if desired, close automatically, with or without a separate actuator. This may be effected on the basis of position, through interaction with the store and/or through interaction with the label.

Figure 9:
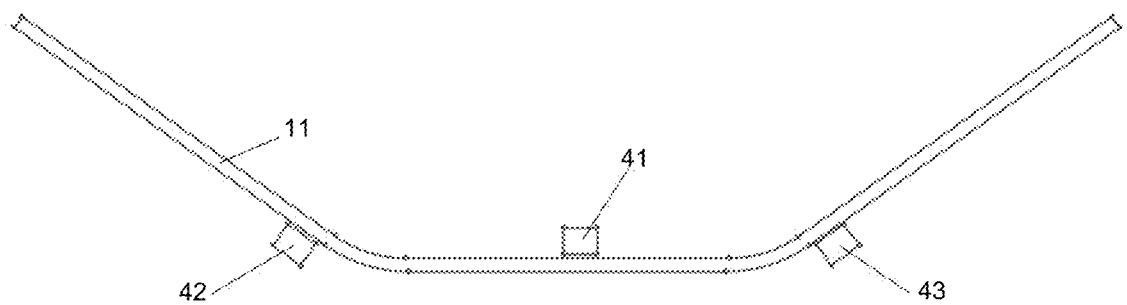

FIG. 8 illustrates an embodiment of a three-fingered gripper. This gripper can open and close. This may be effected actively (using an actuator) or passively (by mechanical interaction with the environment). FIG. 9 shows how the two outer fingers 42, 43 are situated underneath the label and the middle finger 41 is situated above the label. As a result thereof, the label is bent, so that the twine fits therein. When the label 11 has been attached to the twine via the openings 14, 15, the label remains tensioned, under bending stress; this means that the attachment is even better. In this embodiment, the label is preferably made from a readily bendable material. In addition, the label can be fitted without damaging the twine.

Figure 10:
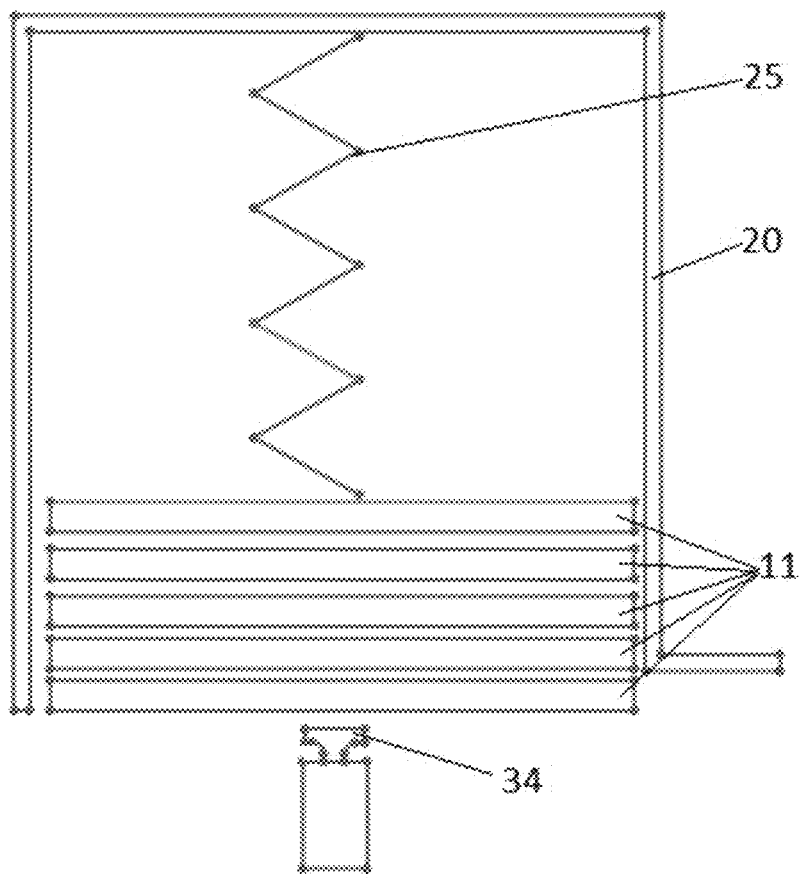
FIGS. 10-12b show other embodiments of storage means.

FIG. 10 is a diagrammatic section of a store 20 filled with labels 11. These labels may be pressed on by a press-on mechanism 25.

The bottom label may be pulled by a head 34 by means of, for example, vacuum, magnetic force or by ensuring that there is a much greater coefficient of friction between the head and the label, than between two successive labels. The head is then placed, for example, on a linear actuator to move the bottom label out of the store (to the right in the drawing).

Figure 11:
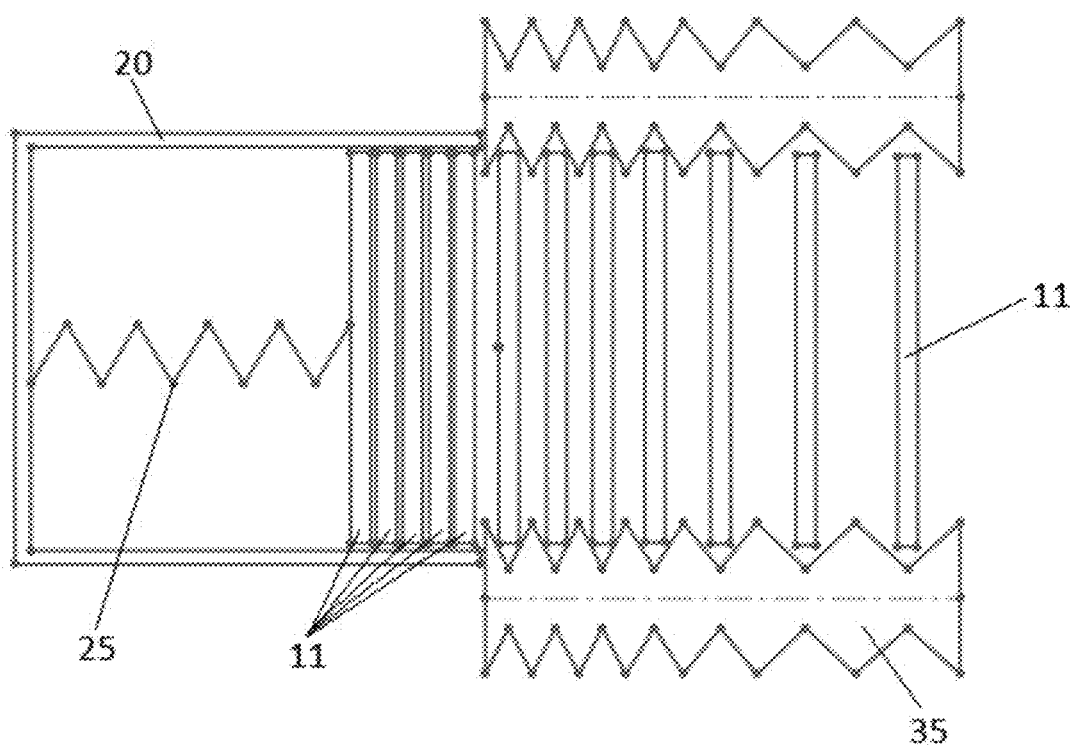

FIG. 11 is a diagrammatic view of a store 20 filled with labels 11. These labels may be pressed on by a press-on mechanism 25. This arrangement illustrates that the store can also be placed horizontally. By applying jackscrews with variable pitch 35 to the side walls of the store, the labels can physically be separated from each other. This may be applied, for example, if the labels are glued together in order to simplify the logistics of transportation and loading of the store. Thus, a number of labels together form a bundle of labels which can be loaded in the store in one go. Other embodiments of a bundle of labels are discussed below.

Figure 12A:
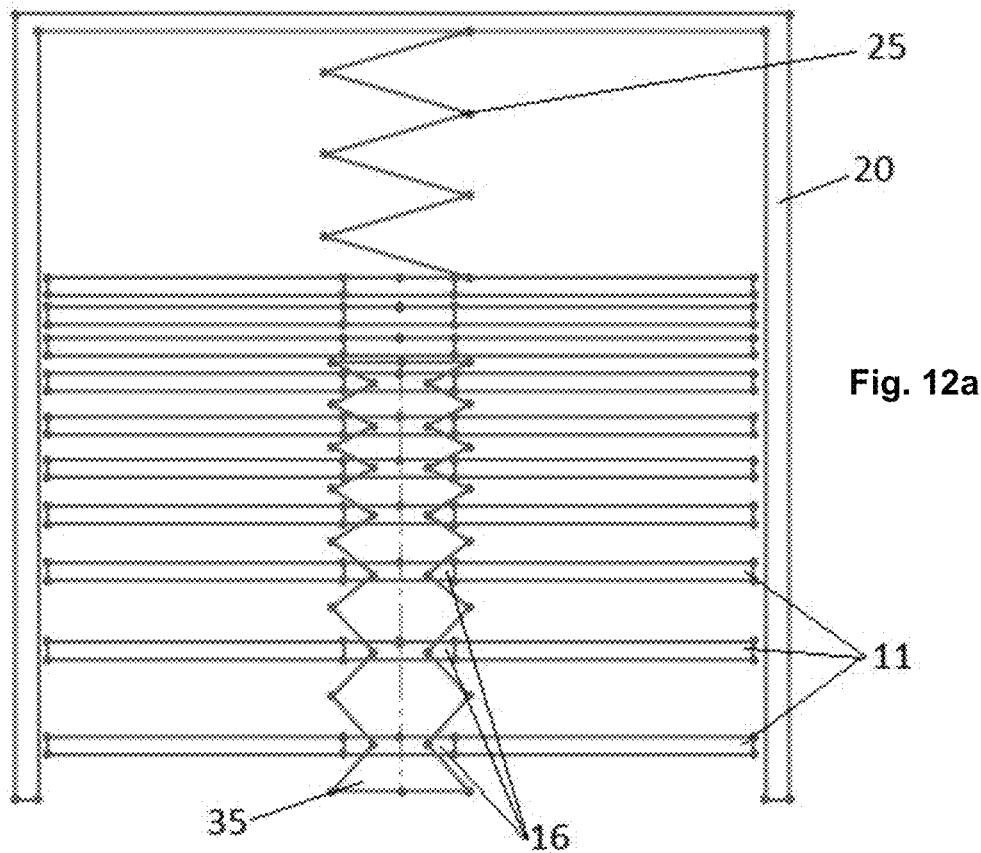
Figure 12B:
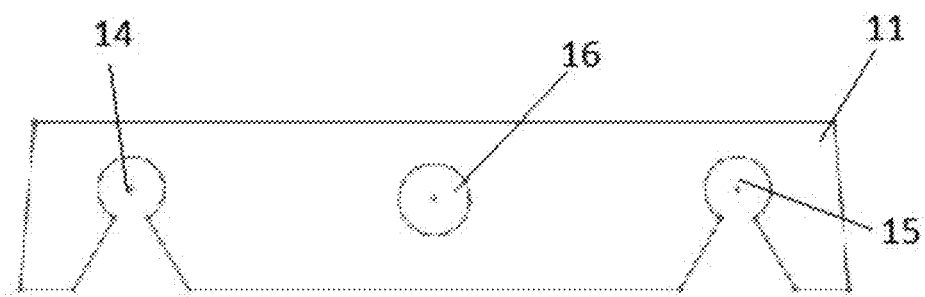

FIG. 12a is a diagrammatic view of a similar store 20. In this embodiment, the jackscrew 35 is placed in the centre of the store. FIG. 12b shows that an opening 16 is provided in the label so that the label can run over the jackscrew. This opening may optionally also be situated on the edge of the label, so that the opening is not closed, and the jackscrew can exit the label via the side. It is also possible to use the existing openings 14, 15 instead of providing an additional opening. In this arrangement, the press-on mechanism 25 may also be omitted.

Figure 13A:
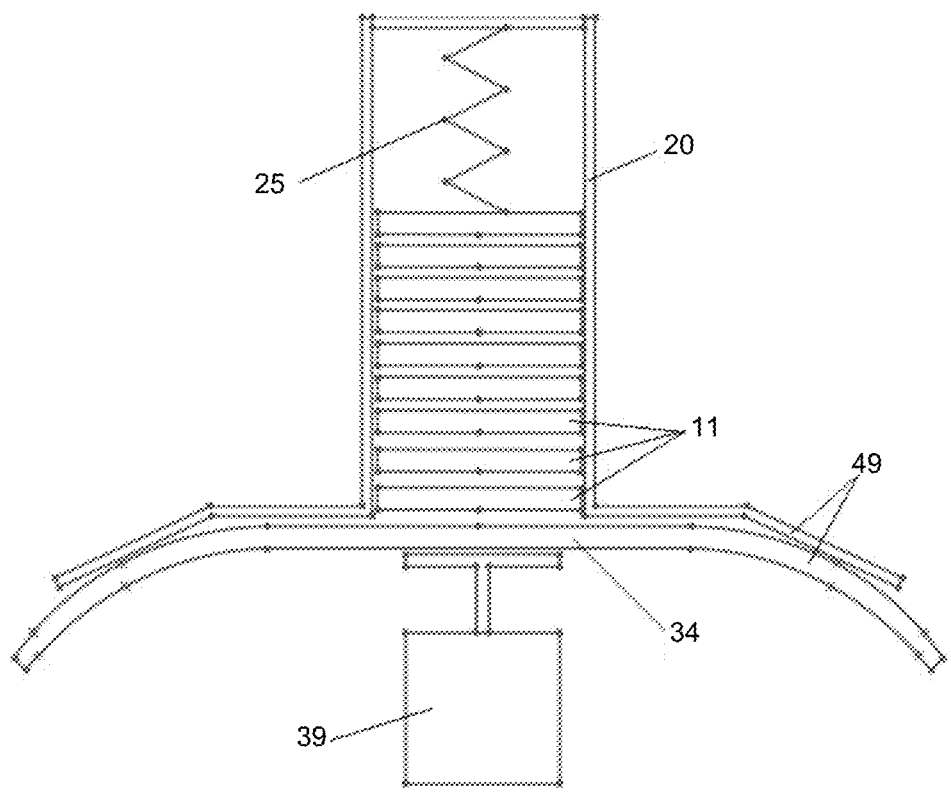
FIGS. 13a and 13b show an embodiment of storage means and of means for rotating a label.

FIG. 13a is a diagrammatic view of a store 20 with a press-on mechanism 25. The central actuator 39 turns a head 34 which is in contact with the bottom label 11. In this way, the label is rotated through 90°. By means of guides 49, the label is also bent into shape over the course of this rotation.

Figure 13B:
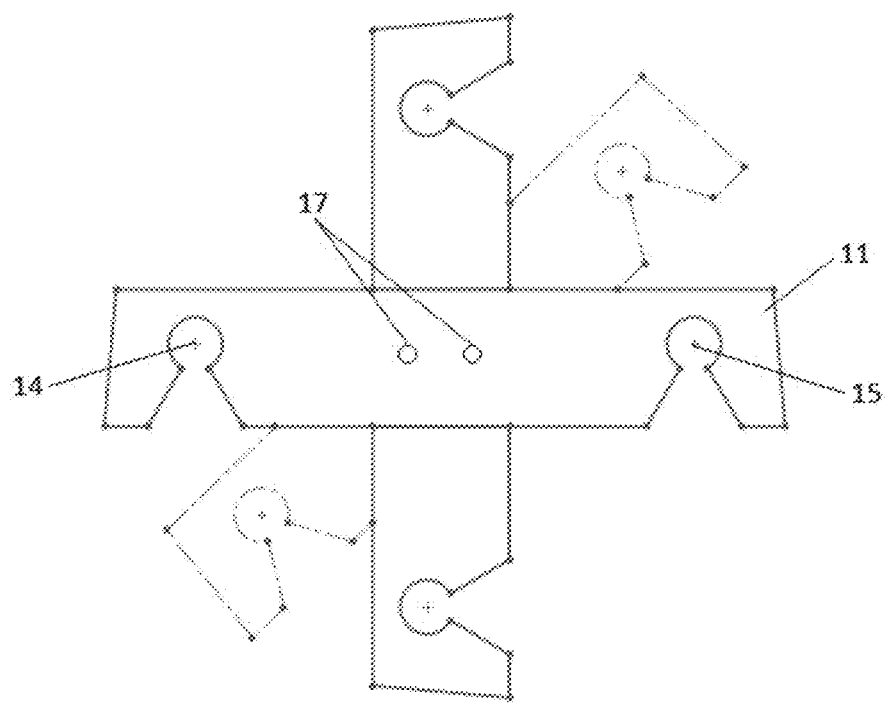

The rotation of the label is illustrated in FIG. 13b. The contact between the head and the bottom label may be achieved by means of a vacuum, magnetic force, a pattern of holes or indentations 17 in the label or providing a surface with high friction.

In the above-described embodiments, means may be provided to retain the penultimate label. FIGS. 14a-14c illustrate a possible embodiment of such separating means, which ensure that one single label is presented to the attachment means. FIG. 14a shows how two different types of labels 11 and 12 are used here. The labels 11 and 12 are provided with a recess and a hole. Successive labels 11 and 12 are alternately provided with a recess 18u, 19u and a hole 18, 19 at the same location. FIG. 14b is a side view of the store 20. The mechanical arrangement of FIG. 14c is placed on the rear side of the store (on the left in the drawing). In this way, the labels 11, 12 can be pushed out of the store. FIG. 14c shows the mechanical arrangement for retaining the labels which consists of two pins positioned on a lever. By tilting the lever 74, the left-hand pin 72 and the right-hand pin 73 can be alternately moved up. As a result thereof, the penultimate label is retained in each case.

Figure 15:
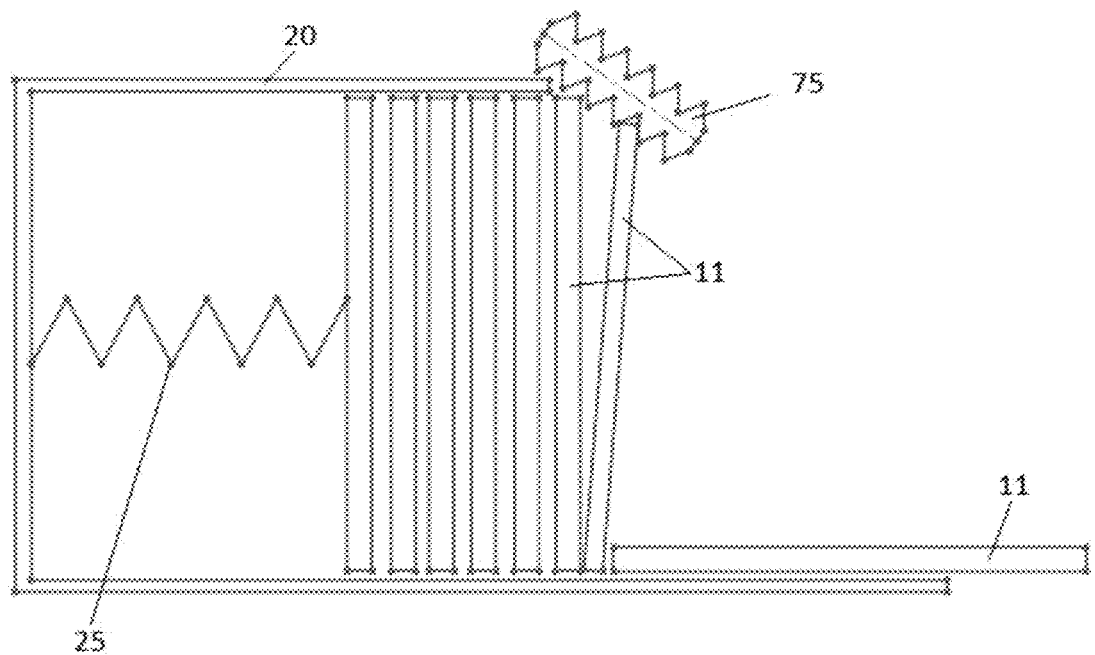
FIGS. 15-18b show embodiments of storage means and release means for releasing a label.

FIG. 15 illustrates how labels which are attached to each other (for example by glue or a breaking edge) can be released. A jackscrew 75 is provided in order to release each label individually. A clamping system may also be provided to hold the label which is ready to be attached to the twine securely.

Figure 16:
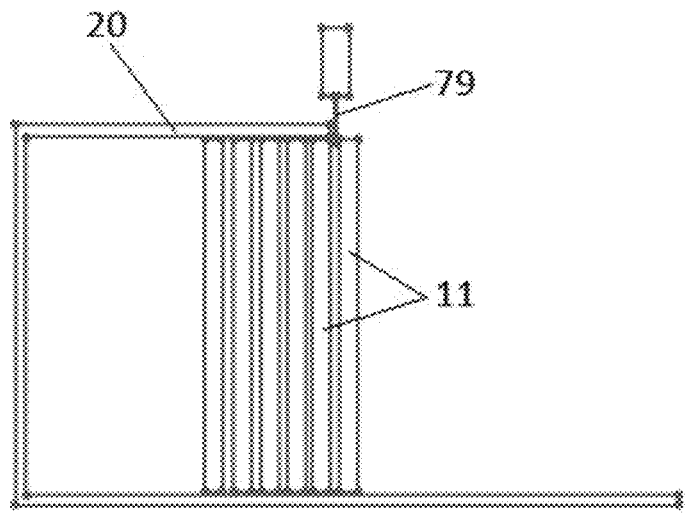
Figure 17:
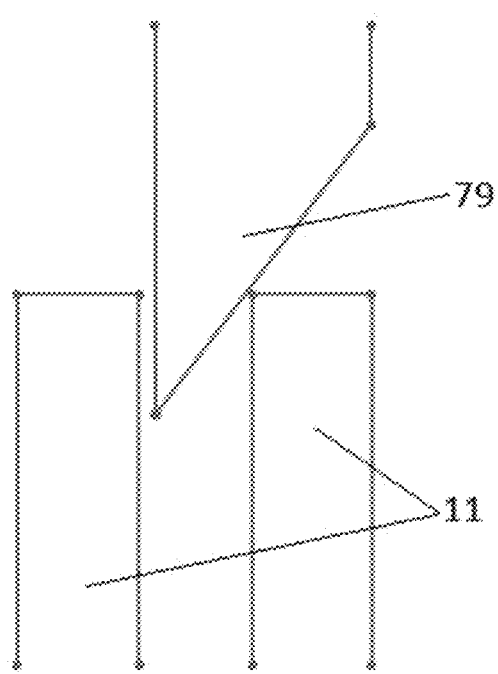

FIG. 16 shows an alternative approach. Here, each label is cut loose from the bundle of labels in the store by means of a cutting head 79. FIG. 17 shows the detail of the cutting head 79.

Figure 18A:
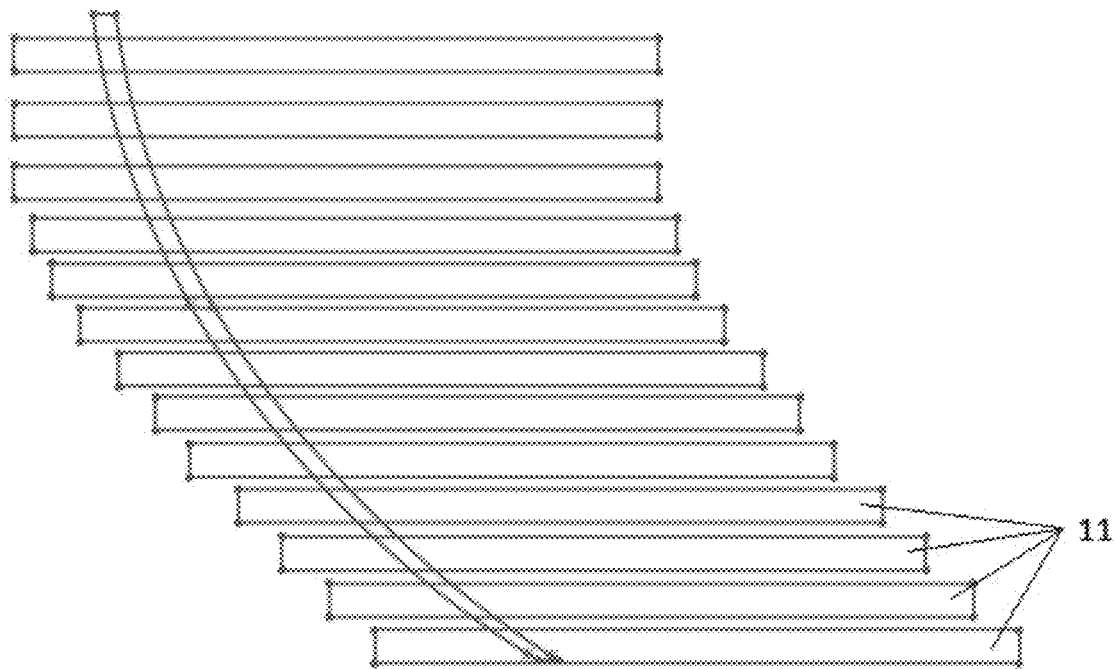
Figure 18B:
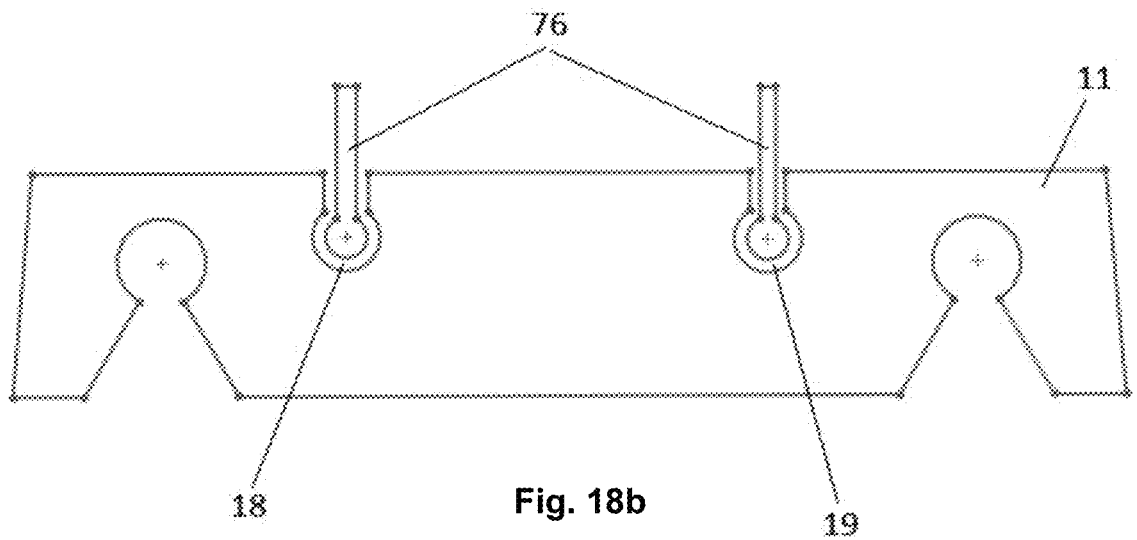

FIGS. 18a and 18b is a diagrammatic representation of an alternative arrangement. FIG. 18a shows a side view of the store. FIG. 18b shows a label as it is positioned in the store. On one side of the store, small round tubes are attached to a small plate 76 across which the openings 18, 19 of the label slide. In this way, it is possible to release labels which are glued together.

Figure 19:
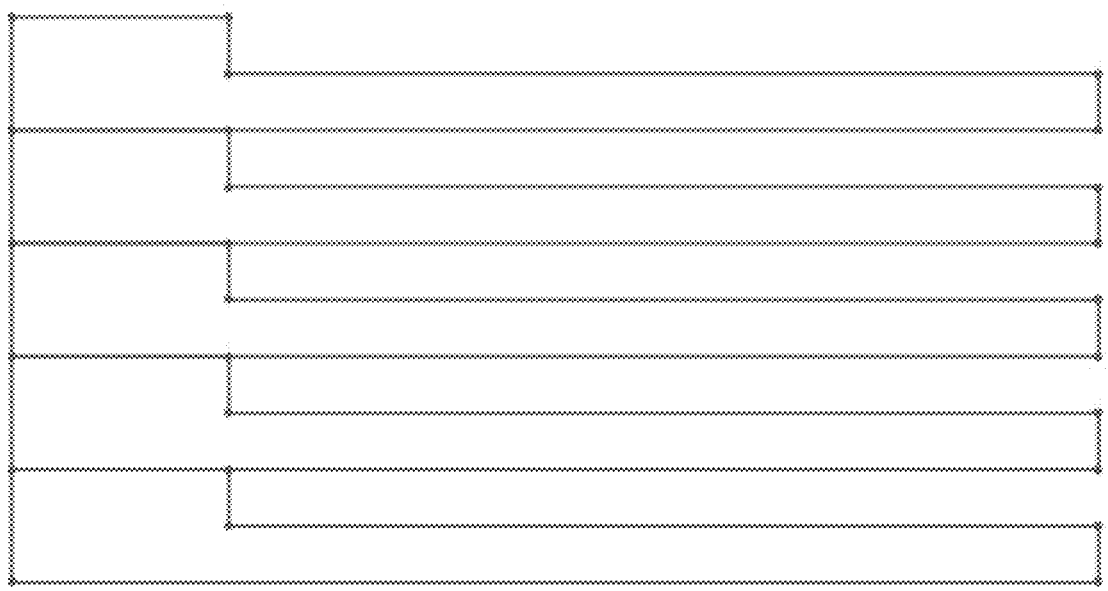
FIGS. 19-20 show embodiments of labels having a modified shape.
Figure 20:
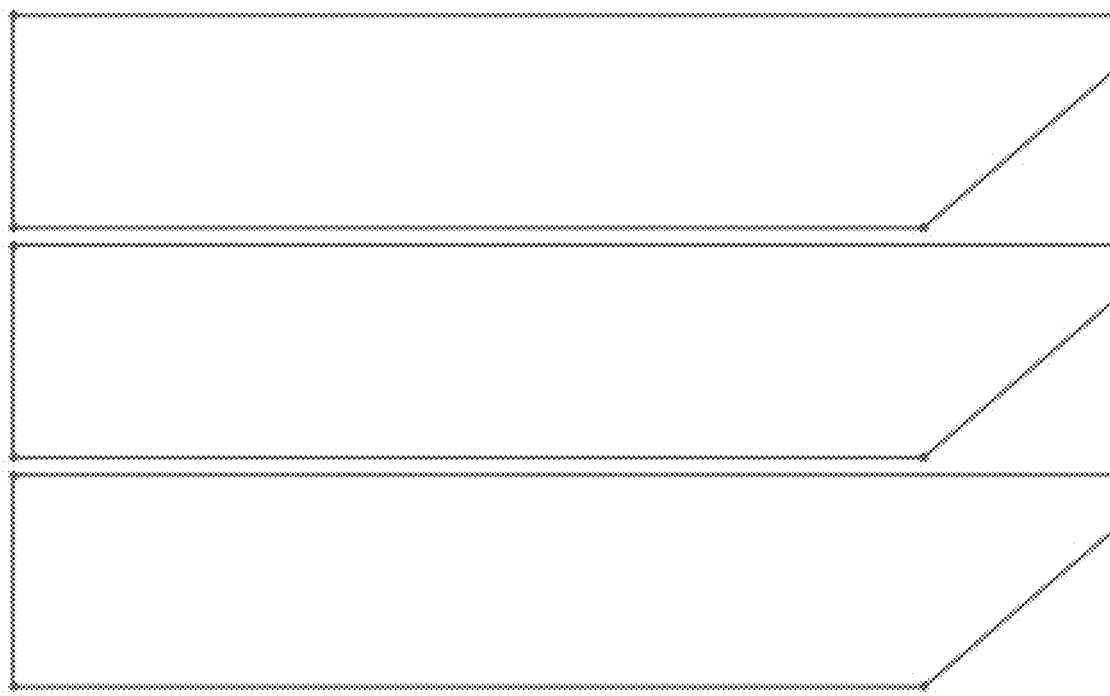

As has already been mentioned above, labels may be attached to each other to form a bundle of labels in order to make replenishing the labels easier for the user. FIG. 19 and FIG. 20 show two possibilities of adjusting the shape of the label in such a way that successive labels can be detached from each other more easily. In FIG. 19, the labels are thicker on one side than on the other side, so that there is always an opening on the other side between two successive labels.

FIG. 20 shows how labels may be provided with a bevelled edge in order to make it easier to detach them from one another. This may be useful, for example, for the arrangement from FIG. 16.

Figure 21A:
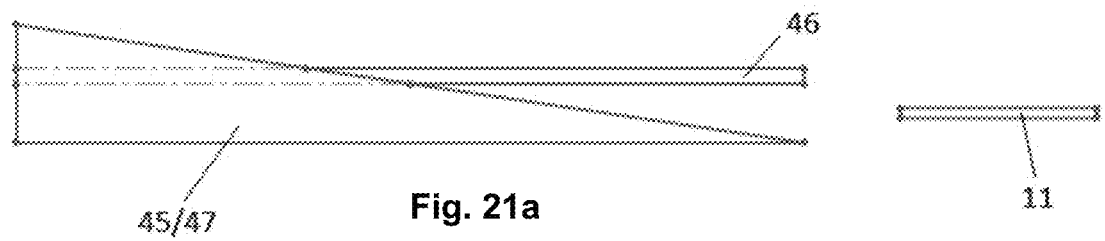
Figure 21B:
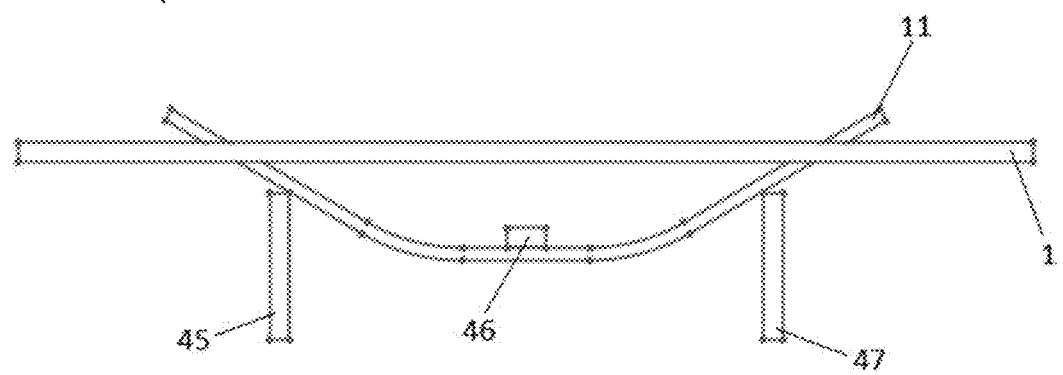
Figure 21C:
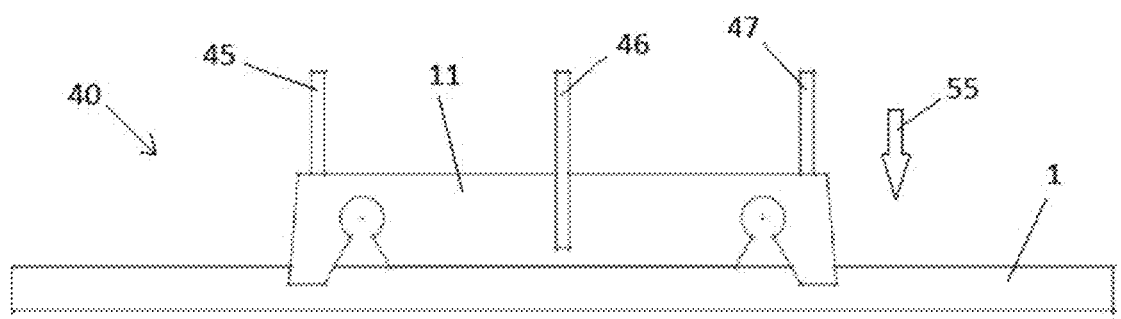

FIGS. 21a to 21c show how a label is deformed in order to attach it to a twine 1. FIG. 21a shows a side view which illustrates the label 11, two outer guides 45, 47 and a middle guide 46. FIG. 21b shows a front view which illustrates how the label is bent between the three guides 45-47, so that the label can easily be pushed over the twine 1. FIG. 21c shows in top view how the label is pushed over the twine in the direction indicated by the arrow 55. The store arrangements described earlier may be combined with attachment means 40 to attach label 11 to twine 1, in which case the label can be bent as in the arrangement from FIGS. 21a to 21c. In another embodiment (not shown), the label does not have two openings 14, 15, but one opening via which the label is attached to the twine. In yet another embodiment, the label is not deformed in order to be attached to the twine, and the label itself already has a bent shape for attachment to the twine.

By means of the preceding arrangements, the label can be pushed over the twine. However, the twine can also be pushed into the label. This is shown in the embodiment of attachment means 40 in FIG. 22 and FIG. 23. In FIG. 22, a twine 1 is moved towards the label by means of an actuator 81 according to the arrow 56. The twine is caught by two small rollers 82, 83, connected to the actuator 81.

FIGS. 23a and 23b show an alternative, in which the small rollers are replaced by two forks 3. The twine is pushed into the label in the direction of the arrow 57. FIG. 23a is a top view and FIG. 23b is a side view.

Figure 24A:
FIGS. 24a-27 illustrate embodiments for connecting labels to each other to form bundles.
Figure 24B:
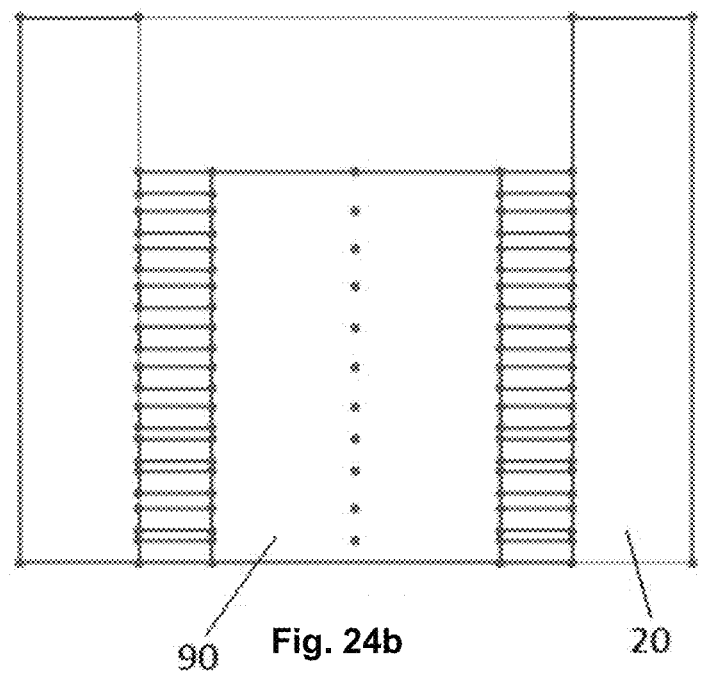
Figure 24C:
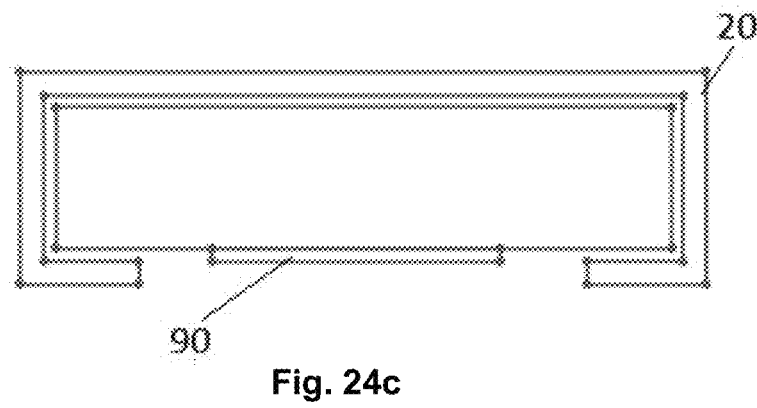
Figure 25A:
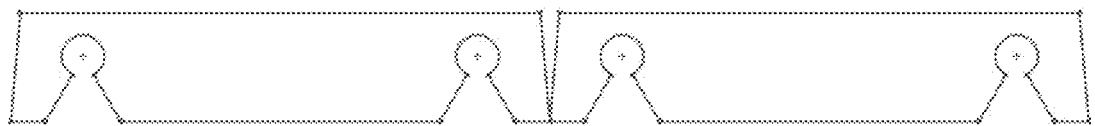
Figure 25B:
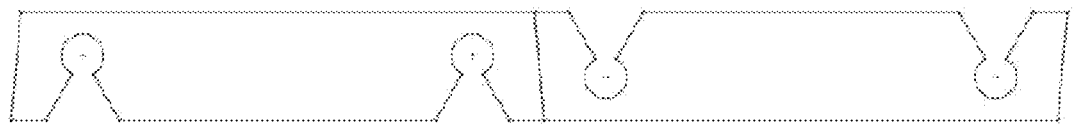
Figure 25E:
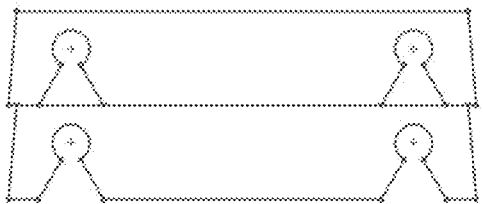
Figure 25E:
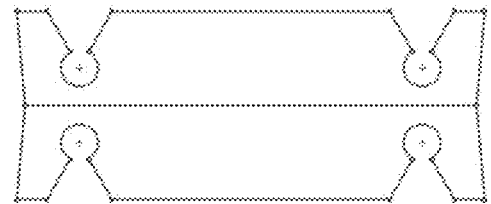
Figure 25E:
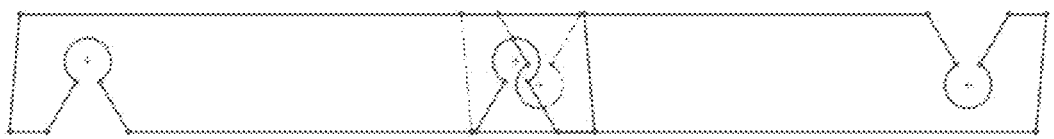

For easy replenishment and treatment of the labels, these may be connected to each other in some form or other to form a bundle of labels. There are many ways of doing this. FIGS. 24a to 24c illustrate how labels (FIG. 24a) may be connected to each other by means of an adhesive strip 90 (front view in FIG. 24b and top view in FIG. 24c) which can be removed after the labels have reached the store 20. In addition, labels may also be glued to each other in the longitudinal direction (FIG. 25a, without alternation; FIG. 25b, with alternation) or in the transverse direction (FIG. 25c, without alternation; FIG. 25d, with alternation). The labels may also be pushed inside one another with or without additional adhesive (FIG. 25e).

Figure 26A:
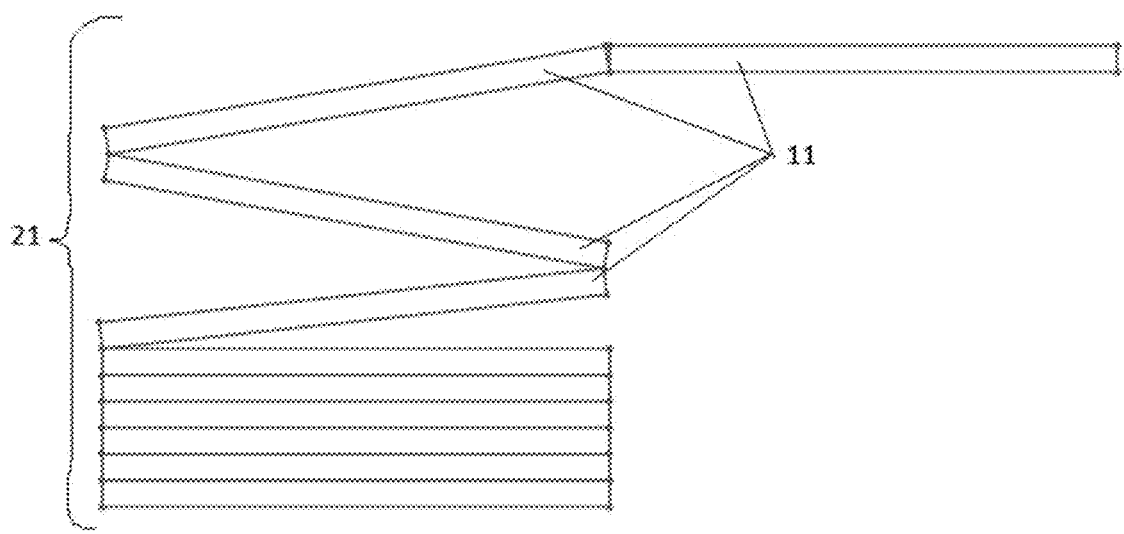
Figure 26B:
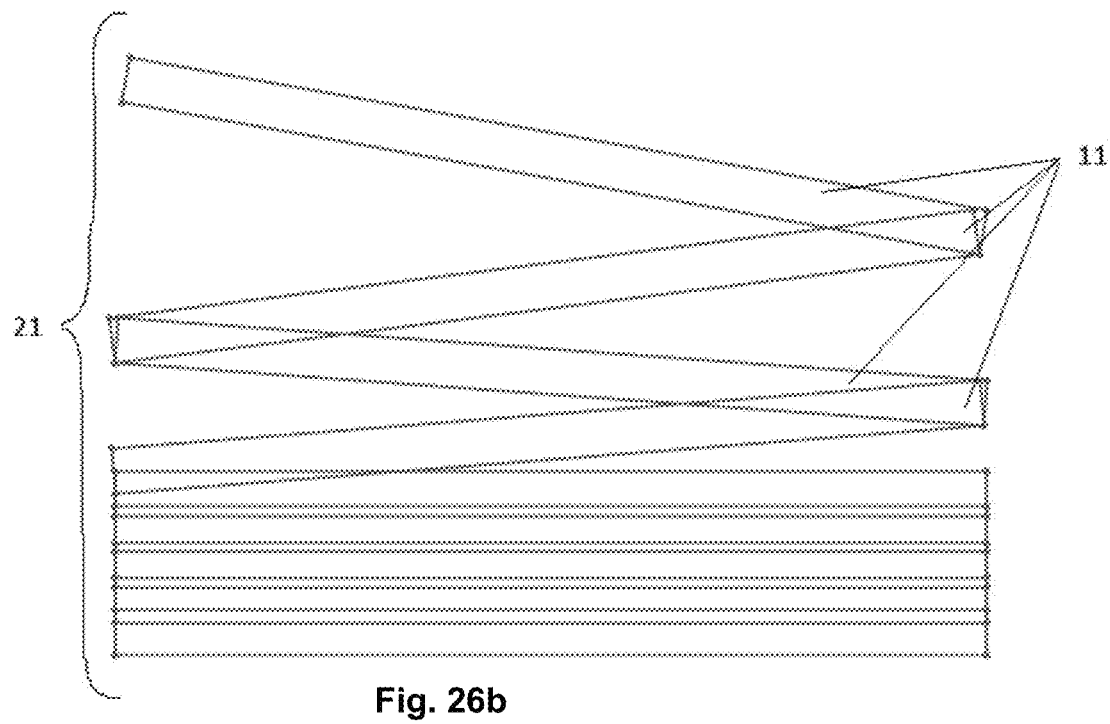
Figure 27:
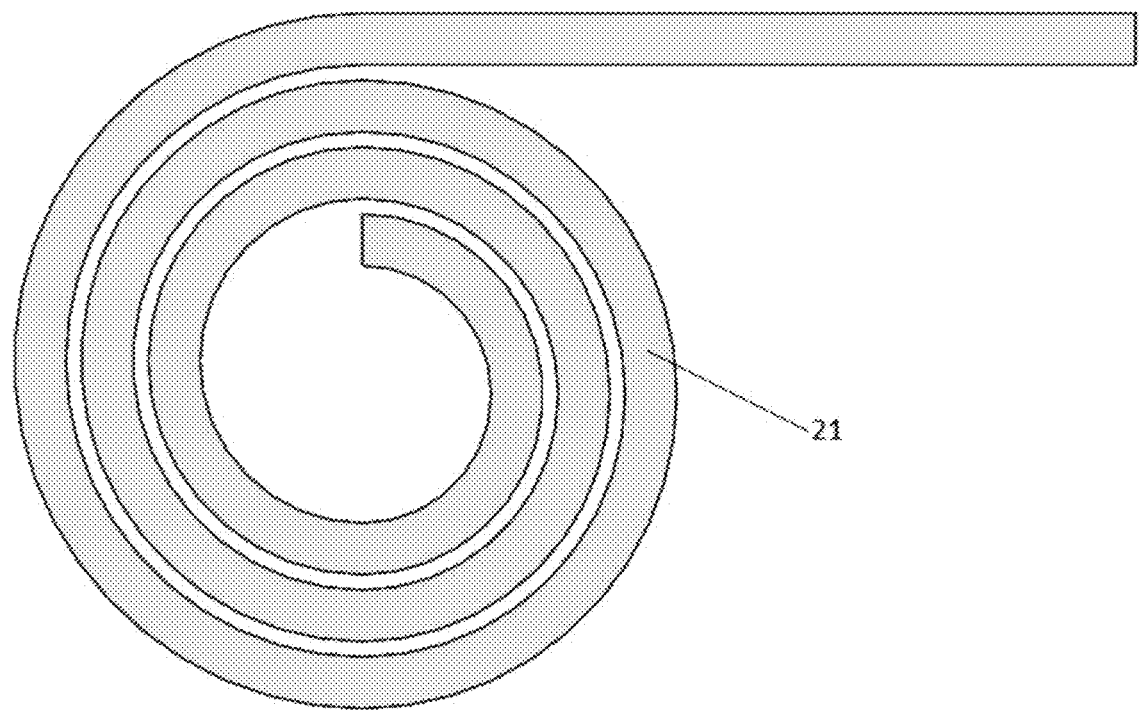

The labels can subsequently be stacked on top of each other in the store, both when glued (FIG. 26a) or when pushed together (FIG. 26b), thus forming a bundle 21. The labels may also be placed on a roll which then forms a bundle 21 of labels (FIG. 27). The roll may be combined with the above-described attachment means. If a bundle of labels is used in the form of a roll, the store may be very simple.

Figure 28A:
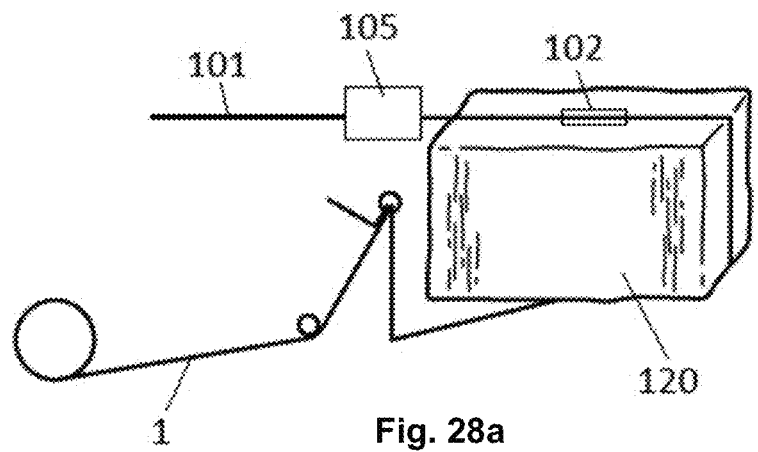
FIGS. 28a and 28b show positions where a device can be built into or incorporated in a bale press.
Figure 28B:
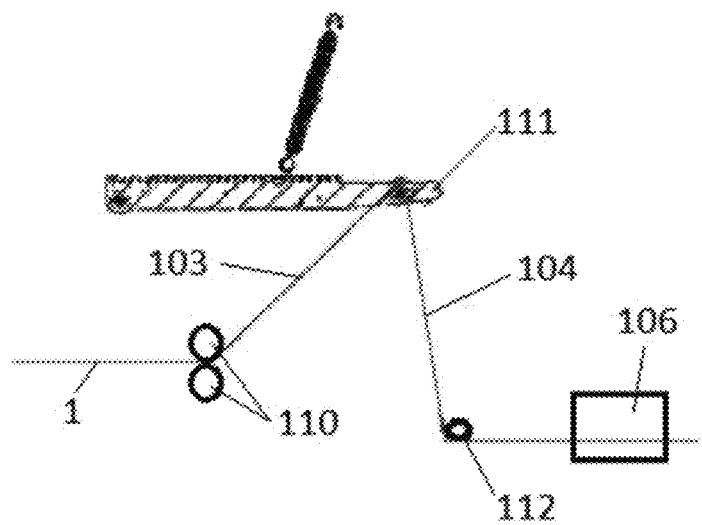

As it can be very compact, a device according to the invention may be built into a bale press at different locations. FIG. 28a shows a part of a bale press in the vicinity of the knotter 105; in the knotter 105, the twine 1 is knotted around the bale 120. The label may be attached upstream of the knotter, at position 101, or downstream of the knotter, on the bale 120, at position 102, as is illustrated in FIG. 28a. Inside the knotter, see FIG. 28b, the label may be arranged between the toothed wheels 110 and the tensioning arm 111 of the knotter (position 103) or between the tensioning arm 111 and the twine guide 112 (position 104), and upstream of the mechanism 106 which ties the knot.

The invention has been described above with reference to specific embodiments. However, the invention is not limited to the described embodiments. Thus, a label may comprise more than two openings. A label may be made completely or partly of plastic, but also of other materials.

It will be clear to those skilled in the art that various modifications and adjustments in form and detail are possible without deviating from the scope of protection of the claims for the present invention.

The invention claimed is:

1. A device for attaching a label for identifying a bale to an elongate flexible object,
the device comprising:
a store for storing labels, wherein the labels have an edge and are provided with a first opening and a second opening on the edge of the label, such that an edge of the first opening and the second opening coincides with a part of the edge of the label, and wherein the first opening and the second opening are adapted to attach the label to the elongate flexible object, wherein the first opening is laterally spaced from second opening, and wherein the labels are bendable and adapted to clamp the elongate flexible object in the first opening and the second opening under bending stress of the label;
an attachment actuator comprising fingers and/or guides adapted to bend the label so that the label can be pushed over the elongate flexible object, and wherein the attachment actuator is configured to bend the label with the fingers and/or guides and push the label in a direction toward the elongate flexible object, over the elongate flexible object or push the elongate flexible object, in a direction toward the label, into the label, to attach the label to the elongate flexible object in such a way that the first opening and the second opening come into contact with the elongate flexible object, such that, when the label has been attached to the elongate flexible object via the first opening and the second opening, the label remains tensioned, under the bending stress of the label, thereby clamping the elongate flexible object in the first opening and the second opening.

2. The device according to claim 1 which furthermore comprises a conveyor belt and/or wheels for transporting the label from the store to the attachment actuator.

3. The device according to claim 2, wherein the conveyor belt and/or wheels comprise a structure, pattern, and/or profile for carrying the label along.

4. The device according to claim 1, wherein the device furthermore comprises a separating arrangement for presenting exactly one label of the previously recited labels to the attachment actuator.

5. The device according to claim 1, wherein the label forms part of a bundle of labels, stored in the store, and wherein the device is configured to release the label from the bundle.

6. The device according to claim 1, wherein the elongate flexible object is a twine.

7. The device according to claim 6, wherein the twine is attached around the bale.

8. A bale press which comprises the device according to claim 1.

9. A method for automatically attaching, in a device, a label for identifying a bale to an elongate flexible object, wherein the label has an edge and is provided with a first opening and a second opening on the edge of the label, such that an edge of the first opening and the second opening coincides with a part of the edge of the label, wherein the first opening is laterally spaced from second opening, and wherein the label is bendable and configured to clamp the elongate flexible object in the first opening and the second opening under bending stress of the label, the method comprising:

storing the label;

attaching the label to the elongate flexible object in such a way that the first opening and the second opening on the edge of the label come into contact with the elongate flexible object, by bending the label so that the label can be pushed over the elongate flexible object and by pushing the label, in a direction toward the elongate flexible object, over the elongate flexible object or by pushing the elongate flexible object, in a direction toward the label, into the label, such that when the label has been attached to the elongate flexible object via the first opening and the second opening, the label remains tensioned under the bending stress of the label, thereby clamping the elongate flexible object in the first opening and the second opening.

10. The method according to claim 9, furthermore comprising transporting the previously stored label.

11. The method according to claim 9, furthermore comprising presenting exactly one label for attachment.

12. The method according to claim 9, furthermore comprising releasing the label from a bundle of labels.

13. The method according to claim 9, wherein the elongate flexible object is a twine.

14. The method according to claim 13, furthermore comprising attaching the twine around the bale.

* * * * *